Figure 1:
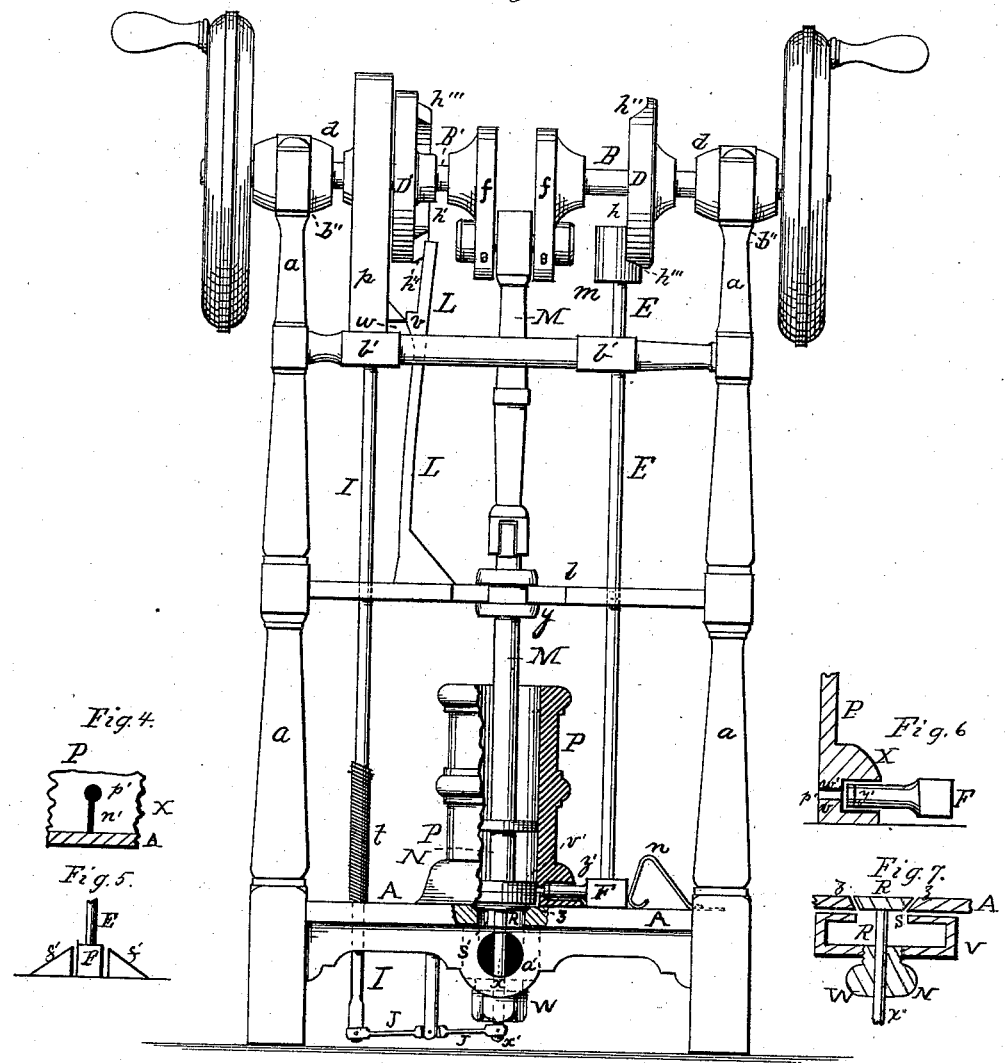

C. F. MOLL & J. H. ALTHEIDE.
Air-Pump.
No. 168,842.
2 Sheets--Sheet 2.
Patented Oct. 19, 1875.
Fig. 2.
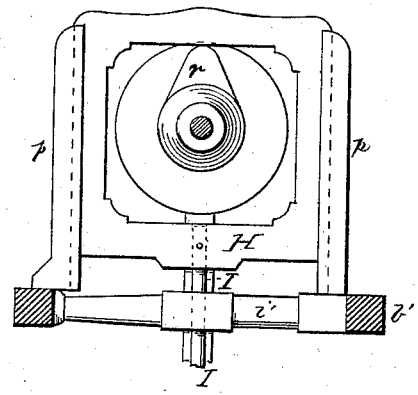
Fig. 3.
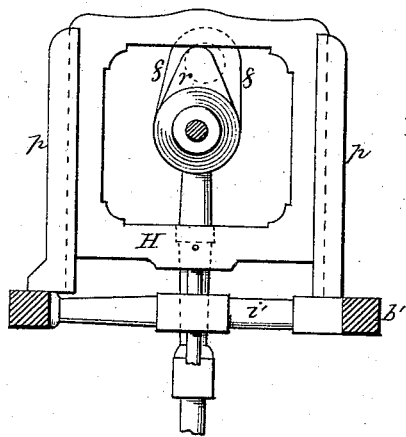
Fig. 8.
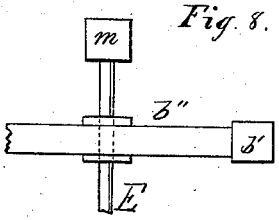
Fig. 9.
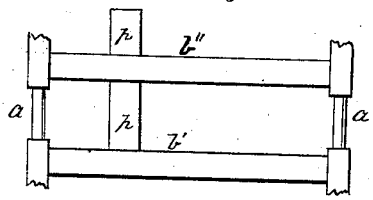
Witnesses:
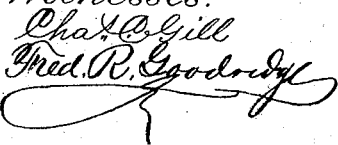
Inventors:
Chas. F. Moll
and
Joseph H. Altheide
by their attys.
Cox & Cox

UNITED STATES PATENT OFFICE.

CHARLES F. MOLL AND JOSEPH H. ALTHEIDE, OF QUINCY, ILLINOIS.

IMPROVEMENT IN AIR-PUMPS.

Specification forming part of Letters Patent No. 168,842, dated October 19, 1875; application filed June 26, 1875.

*To all whom it may concern:*

Be it known that we, CHARLES F. MOLL and JOSEPH H. ALTHEIDE, of Quincy, Illinois, have invented certain new and useful Improvements in Air-Pumps, of which the following is a specification, reference being had to the accompanying drawings.

The invention relates to an improved air-pump wherein, by the use of certain mechanical means hereinafter described, the induction and eduction ports and valves are so controlled and operated as to insure the production of a practically-perfect vacuum in the receiver, the object of the invention being to provide a device for producing a vacuum, wherein valves of any desired weight may be employed, which valves are operated by mechanical means and not by atmospheric pressure, and is intended to remedy the present defects in all valve-machines for exhausting air wherein, by reason of the rarefication of the air in the receiver, there is not pressure sufficient to elevate the induction-valve.

Figure 1 is a side elevation, partly in section, of a device embodying the elements of the invention; Fig. 2, side view of the upper part of the device; Fig. 3, same, with the wheel D omitted; Fig. 4, section of cylinder P, showing slot *n*; Fig. 5, end view of valve F; Fig. 6, side view of same, with section of valve F; Fig. 7, sectional view of lower part of cylindrical chamber V; Fig. 8, detached view of rod E; Fig. 9, detached side view of upper part of the device.

A in the accompanying drawings represents a platform provided at each corner with the upright standards *a*, which are connected at about their center by braces, (not shown,) and near their upper extremities on opposite sides by the braces *b'*, above which, at the upper extremities of the standards, are provided the braces *b''*, the opposite sides of the ends of the standards being connected by braces. (Not shown.)

The above constitutes the frame for sustaining the operative mechanism hereinafter described, and may be changed, as desired, to other convenient forms.

The braces *b''* are provided at their centers with the bearings *d*, to receive the shafts B B', which extend beyond the frame, and are provided on their outer ends with the fly-wheel crank *e*, or a pulley or band-wheel for operating the shafts B B', which terminate at a point adjacent the vertical center of the device, where their ends are secured to the pitman-crank *f*, for operating the piston of the plunger, hereafter described.

Upon the shafts B B', about midway between the pitman and the bearings of the shafts, are respectively secured rigidly upon the shafts the shifting-wheels D D', of suitable dimensions, and provided on their inner faces, but on opposite sides, with the swells *h h'*, which are constructed as follows: The swells follow the periphery of the wheel, inside thereof, and have the inclines *h''*, which are gradual, and the inclines *h'''*, which are abrupt. These inclines are placed on the wheels, so that an abrupt and gradual incline are opposite each other. The purpose of this peculiar construction is to effect a gradual operation of the elements the swells engage, and an instant determination of that operation at the proper period.

The bars *b'* are connected a short distance from the standards *a* by the braces *i i'*, (the former not shown,) and the bars *b* by the brace *l* crossing the vertical center of the device parallel to the shafts B B', and having a box at its center. Upon the upper end of the lever E is secured the friction-roller *m*, so placed and of such dimensions as to come in contact with, and be operated by, the shifting-wheel D only when impinging against the swell *h* thereon, the construction of which causes the operation to be gradually begun, but instantly determined. The lever E extends downward, passing through a slot in the brace *i*, and secured on a pivot-fulcrum in the brace *l*, and at its lower extremity is secured to the head of the valve F, which head is operated upon by the spring *n* giving it an inward pressure.

It is obvious that various devices may be employed to effect the purpose of the mechanism last above described, the object of which is, in brief, to provide a lever having an alternate inward and outward or reciprocal movement.

Upon the brace *i'*, and attached at its sides to the braces *b''*, are secured the upright guides $p$, within which operates vertically the sliding frame H, within which is rigidly secured upon the shaft B' the cam $r$, so placed and constructed that its extreme outer end is at its highest point somewhat before the crank-pin is at its highest position, and, further, that in operating it touches only the inside of the upper bar of the frame H. At the center of the lower part of the frame H is secured the draw-rod I, which extends downward oppposite and parallel to the lever E through the center of the brace $i'$, and through the brace $l$ and platform A, and is furnished above the latter with a spiral spring, $t$, which incloses the rod and gives it a downward bearing. The lower end of the draw-rod being secured below the platform to one end of a spring-lever, J, pivoted at its center to the lower end of the depending standard $a'$, and secured at its other end to the lower extremity of the stem of the valve R in such manner as to permit a slight lateral play, the purpose of the spring-lever J being to take up any lessening of the tension occasioned by the wearing of the cam $r$, and also to insure an instant operation of the valve R.

In this connection it is plain that the spring $t$ may be dispensed with, and the spring-lever J arranged to depress the draw-rod.

It is obvious that the lever J may be made of any material, but it is preferable to employ it of the construction aforesaid.

It is evident that other constructions may be substituted for the devices above described, the object of which is to furnish a draw-rod having an alternate upward and downward or reciprocal movement.

To the brace $l$, adjacent the point where it is traversed by the rod I, is secured the base of the bar-spring L, which extends upward parallel to the rod I, and at a suitable place is provided with the stop $v$, having its lower surface inclined upward and outward, and its upper surface flat, the upper portion of the spring L being in such relation to the inner face of the shifting-wheel D' that the upper end of the bar is thrown inward only when impinging the swell $h'$ on the wheel. On the lower part of the frame H, opposite the spring-bar L, is placed the stop $w$, having its upper surface inclined downward and inward, and its under surface flat.

Thus, when the wheel D' is rotated, and the swell $h'$ comes in contact with the spring L, the upper end of the latter is gradually bent inward, and the stops $v$ and $w$ released, which permits the spring $t$ to operate and depress the draw-rod I, which depression continues until the bar-spring L passes from contact with the swell $h'$, at which movement the bar-spring L instantly retracts, and the ascent of the draw-rod I is instantly begun by the cam $r$ coming in contact with the frame H. To accomplish this result the swell $h'$ is so constructed and placed that the base of its incline $h''$ is in the same vertical plane as that part of the cam $r$ which first comes in contact with the frame H.

To the crank $f$ is properly secured the head of the pitman M, which connects with the piston-rod, which extends downward on the line of the vertical center of the device passing through the box $y$, placed at the center of the brace $l$. To the lower end of the piston-rod is secured the piston, packed, and provided on its lower surface with a rubber or other flexible plate, so that the piston, when depressed upon the platform encompassed by the base of the cylinder P, is in an air-tight relation thereto, the cylinder being secured at the center of the platform A. In the center of the space inclosed by the base of the cylinder is provided a circular induction-port, S, the sides of which are beveled toward its center, and, if a ground-valve is used, the edge of the aperture is also ground. This port coincides with the vertical center of the plunger N, which, when depressed, rests upon the rim $z$ of the material about the port S. The valve R consists of a piece of material of any desired weight, and may be covered on its under surface with flexible material or ground, and of such form as to fit snugly in the port S, and, being therein, its upper surface is on a level with the upper surface of the rim $z$.

Thus, when the plunger N is in contact with the rim $z$, the port S is perfectly sealed.

The stem $x'$ of the valve R descends through the chamber V, secured on the under side of the platform, directly below the cylinder, and provided with an aperture corresponding with the induction-port S, and also with an aperture, $a'$, to receive the pipe leading to the receiver. The valve-stem $x'$ also passes through a stuffing-box, W, secured under and in the chamber V, to prevent the entrance of air, and operate as a guide, the lower extremity of the valve-stem $x'$ being pivoted to the lever J, as aforesaid.

The foot $y'$ of the valve F is provided with a rubber or other flexible covering, and enters the recess or aperture $w'$ in one side of the base of the cylinder P, coming in contact with the annular shoulder $v'$ therein, in the center of which is an eduction-port, $p'$, of reduced diameter leading into the cylinder, and having its mouth closely adjacent to the base of the cylinder. Thus, when the valve F is in contact with the shoulder $v'$ the port $p'$ is securely sealed. From the mouth of the port $p'$ a slight slot, $n'$, leads downward to permit the escape of air compressed by the descent of the plunger after it passes the port $p'$. The cylinder P is secured in position by a seat, X, of any suitable construction, and the positive movement of the valve F is secured by the guides $f'$ placed on each side thereof.

The operation is as follows: Presuming the pipe connecting with the receiver to be secured about the aperture $a'$, and the piston N elevated to its greatest height, the movement of the shafts B B' operates the pitman, causing the piston to begin to descend. The movement of the shafts progressing, the friction-roller m begins to ascend the incline h'' of the swell h on the wheel D, forcing the upper end of the lever E inward, and consequently the lower end outward, thus retracting the valve F, opening the eduction-port p', and permitting the escape of air from below the descending plunger N. This movement continues until the piston has descended below the mouth of the eduction-port p', the air confined below that point escaping through the slot n'. Thus it is evident that all the air in the cylinder is wholly expelled when the plunger N reaches the rim z. The rotation of the shafts, which has placed the plunger in the position last aforesaid, has rotated the wheel D, so that the instant the plunger bears firmly upon the rim z the roller m instantly passes down the incline h''', and being no longer sustained by the swell h the spring n acts upon the valve F, throwing inward the lower end of the lever E, and forcing the head of the valve against the shoulder v', effectually sealing the eduction-port p'. There is now a complete absence of air under the plunger N.

During the above operation the stop v, on the bar-spring L, has been in contact with the stop w on the frame H, which has sustained the frame, and consequently the draw-rod I, thus holding the valve R securely position, sealing the induction-port S, and consequently preventing any air being forced into the receiver. During the slight interval, which is only sufficient to permit the escape of the air below the port p' through the slot n', neither the lever E or draw-rod I are operated, and consequently all the air contained in the flexible surface lining the plunger is expelled.

After said interval the head of the bar-spring L begins to ascend the incline h'' of the swell h' on the wheel D' at the same instant the pitman begins to elevate the plunger N, the eduction-port p' being securely sealed. The instant the bar-spring L has been bent sufficiently far back the catches v and w are released, which frees the frame H, permitting the draw-rod I to descend, which depresses the outer end of the spring-lever J, elevating its other end, thus throwing up the valve R, opening the port S, and permitting the exhaustion of the air through the pipe connecting the aperture a'' with the receiver. Thus the induction-port S remains open as long as the bar-spring L is in contact with the swell h', during which time the eduction-port p' is closed, and the plunger has accomplished its ascent since, the roller m not being in contact with the swell h, the spring n closes the valve F.

In the above operation of the lever E the devices opposite it have taken the following position: the frame H is suspended on the stop v on the spring-bar L, the upper end of which is just at the base of the incline h''. The further movement of the shafts B B' causes the plunger to begin its ascent, and the spring-bar L, riding up the incline h'', releases the catches v and w, which permits the frame H to descend, thereby operating the spring-lever J and opening the valve R and eduction-port S, and thus the process of exhausting is begun.

The above position is maintained until the plunger nearly reaches its height, when the position is as follows: the bar-spring L is just at the head of the incline h''', the cam r is just beginning to impinge upon the frame H, and the valve F still closes the eduction p'.

A further movement of the shafts B B' causes the piston to pass its center, and begin to descend and rotate the wheel D', causing the bar-spring to ride suddenly down the incline h''' and the cam r to begin to elevate the frame H, thus tightening the draw-rod I, and so causing the spring-lever J to be elevated at its outer end, thus depressing its inner end, and so binding the valve R to place in the induction-port S, the elasticity of the lever permitting the frame H to pass over the height of the cam, in doing which the stops v and w pass each other, and when the cam has ceased to operate the stud on the bar-spring engages the stud on the frame, and holds it suspended, and thus secures the draw-rod I in a position that binds the valve R firmly in place, closing securely the induction-port S. The moment the piston begins to descend, the incline h'' on the wheel D comes in contact with the roller m, which operates the lever E, as aforesaid, to permit the escape of air from below the descending plunger.

What we claim as our invention, and desire to secure by Letters Patent, is—

1. In an air-pump, the shifting-wheel D, provided with the swell h, having the inclines h'' and h''', for the purpose of operating the lever E, in combination with the eduction-valve F, substantially as set forth.

2. The combination of the wheel D', spring-bar L, having stop v, frame H, having stop w, rod I, lever J, and cam r, substantially as set forth.

3. The lever J, in combination with the rod I, valve R, port s, and plunger N, substantially as set forth.

4. The slot n', in combination with the port p, substantially for the purpose set forth.

5. The wheels D D', having the swells h h', in combination with the cam r, lever E, spring-bar L, frame H, rod I, lever J, and valves F and R, substantially as set forth.

In testimony that we claim the foregoing improvements in air-pumps, as above described, we have hereunto set our hands and seals this 15th day of June, 1875.

CHARLES F. MOLL. [L. S.]
JOSEPH H. ALTHEIDE. [L. S.]

Witnesses:
JOHN P. MENKE,
PLEASANT I. BROWN.